United States Patent Office 2,793,612
Patented May 28, 1957

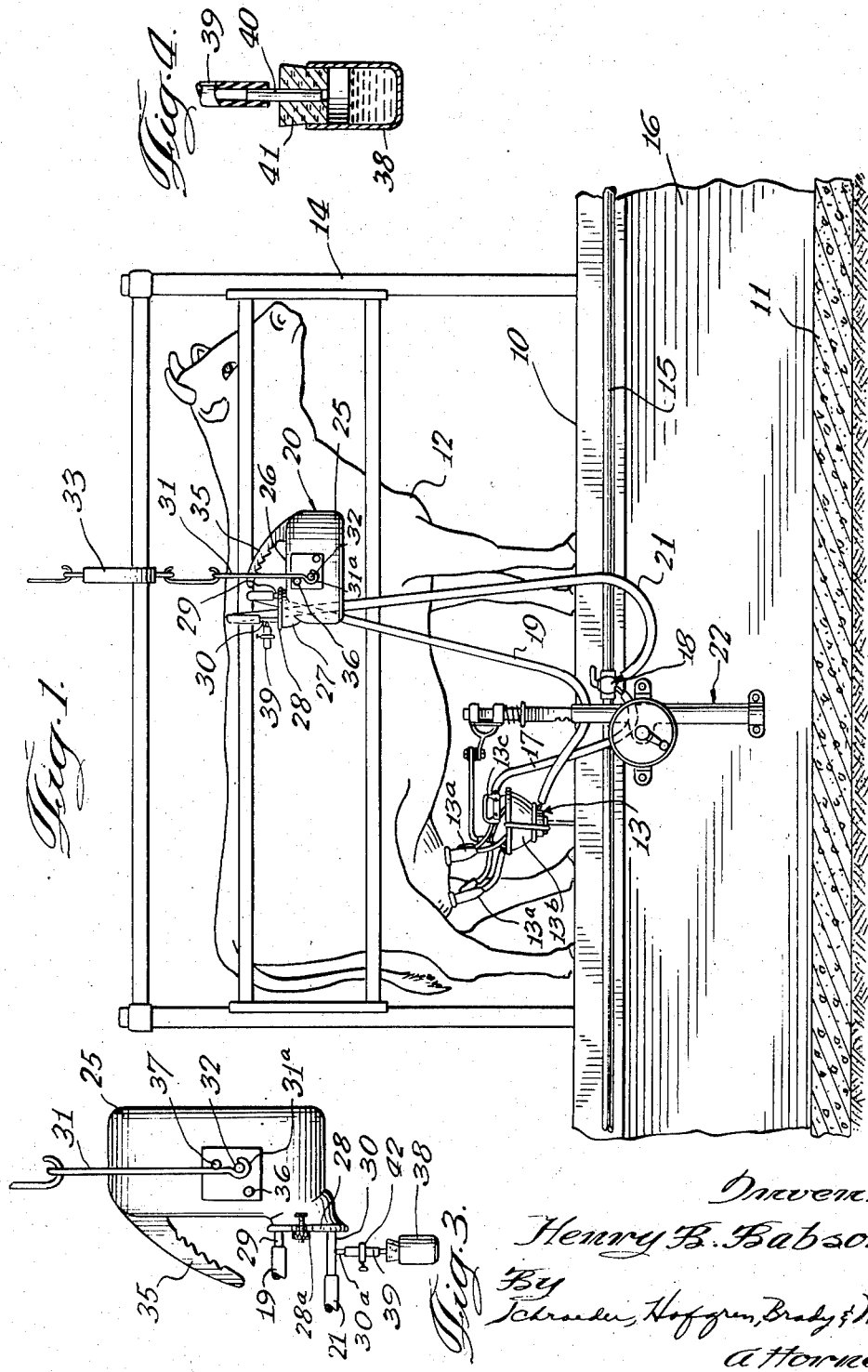

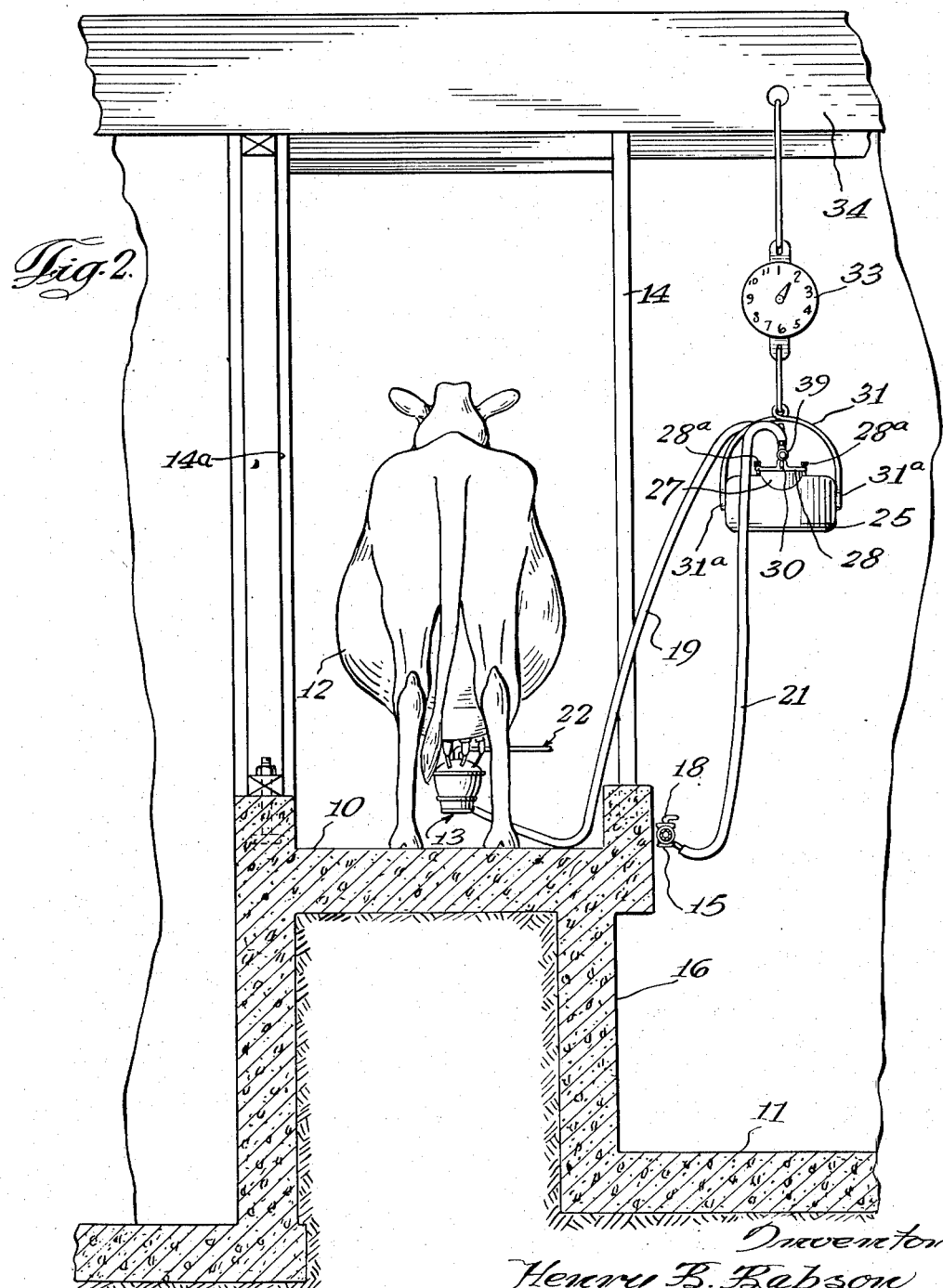

2,793,612

MILK RECEIVING APPARATUS

Henry B. Babson, Chicago, Ill., assignor to Babson Bros. Co., a corporation of Illinois Application February 17, 1955, Serial No. 488,817

5 Claims. (Cl. 119—14.03)

This invention is concerned with a milk receiving apparatus and more particularly with an intermediate milk receiver for use in connection with milking systems utilizing a carry-away milk line.

Modern dairy farmers prefer to keep at least periodic production records of the individual animals in their herds. Where "carry-away" systems are in use, the milk flows directly from the animal into the milk line where it is mixed with the milk from other animals as it flows on to an ultimate destination, such as a holding tank, and there is no opportunity to measure each animal's yield. It is, therefore, necessary to provide some sort of auxiliary equipment to permit a measurement of the milk given by each animal.

Several forms of intermediate milk receivers are well known, see for example Merritt Patent 2,680,452 and Hapgood Patents 1,910,830 and 2,037,467. In the systems of each of these patents a valved, intermediate receptacle is provided which, with one setting of a valve or valves, collects the milk flowing from the milk withdrawing apparatus, and with another setting of the valves allows the milk to flow therefrom into the carry-away pipe line. The various apparatus shown in these patents have the common defect that they each include at least one valve through which the milk flows and which must necessarily be disassembled and washed following the milking operation. This adds unnecessarily to the farmer's work.

It is a principal object of the present invention to provide an intermediate milk receiving chamber for a carry-away milking system which may be used to collect and measure the output of individual cows and which utilizes no complicated mechanical valves.

One feature of the invention is the provision of a milk receiver comprising a chamber having an inlet and an outlet, means for connecting the inlet to milk withdrawing apparatus, means for connecting the outlet to a carry-away milk line and means for supporting the chamber for movement between the first position in which milk from the animal collects in the chamber and a second position from which milk empties from the chamber through the outlet. Another feature is that stop means are provided for limiting the movement of the chamber and that the stop means, chamber and supporting means are so associated that the chamber is in a condition of stable equilibrium in both of the positions.

Still another feature is that the receiver comprises a generally round chamber having a top and a bottom with an opening in the top adjacent the periphery thereof, a removable lid for the opening and having an inlet and an outlet, means for connecting the inlet to milk withdrawing apparatus, means connecting the outlet to a carry-away milk line, a handle secured to the chamber diametrically opposite the opening and projecting over the top of the chamber, and mounting means for pivotally supporting the chamber about an axis transverse to the diameter of the chamber drawn between the handle and the opening, the chamber being movable between a first position in which the chamber is upright and the milk from the animal collects therein, and a second position 90° displaced therefrom and in which the outlet is at a low point and the milk empties from the receiver through the outlet.

Further features and advantages will readily be apparent from the following specification and from the drawings, in which:

Figure 1 is a side elevational view of a stall showing a cow being milked and illustrating the use of the present invention;

Figure 2 is an enlarged end elevation taken looking from the left of Figure 1, parts being omitted for the purpose of clarity;

Figure 3 is an enlarged fragmentary view showing the milk receiving means in emptying position; and Figure 4 is enlarged fragmentary view, partially in section, of a small receptacle for taking a sample of the milk in the receiver.

In the last decade, and particularly in the last four or five years, carry-away milking systems have been gaining wide acceptance with farmers. Where in the past such systems have been used primarily only by large dairy farms milking hundreds of cows, they are now to be found on smaller establishments where possibly only a dozen or so cows are milked. As pointed out briefly above, dairy farmers must keep production records on their herds in order to eliminate the poorer producers. Normally such records are not kept continuously but it is desirable that a production check be made at periodic intervals. In addition, it is necessary that samples of each animal's milk be taken at intervals to permit testing for mastitis, butterfat content, and the like.

With bucket milkers it is a relatively simple matter to weigh the filled buckets following the milking of each animal and, if desired, to take a small sample of the milk as it is being poured from the bucket to a milk can. With a carry-away milk line, however, this procedure is impossible and, as mentioned above, presently available equipment for collecting each animal's milk in a carry-away system utilizes mechanical valves which are troublesome to wash and sanitize properly.

Referring now to the drawings, and particularly Figures 1 and 2, a portion of a milking parlor is shown. A raised cow floor 10 is several feet, as 2½ feet, above an operator's alley 11 so that the operator may wash the udder of an animal 12 and handle the milking apparatus indicated generally as 13 without unnecessary stopping or squatting. A structure 14 which may be of iron pipe, forms one side of a stall while the wall 14a of the milking parlor may form the other side. An evacuated carry-away milk pipe line 15, which may be of either stainless steel or glass, runs along the upper portion of wall 16 which joins animal floor 10 with the operator's alley 11.

Milking apparatus 13 includes four teat cup assemblies 13a, each comprising a rigid outer shell and an inner flexible inflation having an integral milk tube, and an intermediate milk receiving bowl 13b. Milk is delivered directly from the teat cup assemblies to the bowl 13b, which is evacuated, the bowl having a capacity sufficient to hold at least all the milk delivered by a single pulsation of the milking apparatus, but less than all the milk given at a single milking. A pulsator 13c is mounted on the top of bowl 13b and is connected to the evacuated line 15 through a hose 17 and valve 18. The pulsator operates in the usual manner alternately to evacuate and connect to atmosphere the space between the rigid shell and flexible inflation in each teat cup. A milk hose 19 is connected to bowl 13b and, through intermediate milk receiving apparatus indicated generally as 20 and hose 21, to the milk line 15, applying an operating vacuum to the milking apparatus.

Bowl 13b serves to separate the milk from the milk tubes of the inflations as it flows into the bowl, preventing the formation of an oscillating column of milk in milk hose 19 and washing of the animal's teats by milk during the expansion of the inflations. Further details of the construction and operation of the milking apparatus 13 may be found in copending Thomas application, Serial No. 237,922, filed July 21, 1951, now Patent No. 2,709,416, issued May 31, 1955.

An adjustable supporting mechanism indicated generally as 22 is secured to wall 16 and supports the milk withdrawing apparatus 13 under the animal. The supporting mechanism may be adjusted to vary the height of the milk withdrawing apparatus and also to apply a forward pull thereto providing the desired, resilient downward and forward tug and pull on the animal's teats. Further details of the construction of the supporting mechanism may be found in Babson Reissue Patent Re. 22,368 and in copending Thomas application, Serial No. 258,855, filed November 29, 1951, now Patent No. 2,747,544, issued May 29, 1956.

The intermediate milk receiver 20 includes a chamber 25 of substantial size as several gallons and is here illustrated as a conventional milker bucket of the type shown in McCornack Patent 1,859,213. The milker bucket is generally round in cross section and has a top surface 26. An open ended neck portion 27 is provided on the top surface of the chamber and adjacent the periphery thereof. A lid 28 closes the open end of neck 27 and is secured to the chamber by bolts 28a. The lid 28 is provided with an inlet nipple connector 29 and an outlet nipple connector 30, milk hose 19 being connected to the inlet nipple and hose 21 being connected to the outlet nipple.

Chamber 25 is pivotally suspended from a bail 31 which has a loop 31a formed at either end thereof and engaging pivot pins 32 provided on either side of the chamber. (While only one looped end 31a and pivot pin 32 are shown in Figure 3, it will be understood that the arrangement is duplicated, but in reverse, on the far side of the chamber.) Bail 31 is in turn carried by a scales 33 which may be suspended from an overhead beam 34. A handle 35 is secured to the upper surface 26 of chamber 25 at a point generally diametrically opposite open neck 27 and projects up and over the top of the chamber.

During the milking operation chamber 25 will be placed in the position shown in Figure 1, the center of gravity of the chamber, both with and without milk therein, being to the right of pivot pin 32 as viewed in Figure 1. A stop 36 engages bail 31, the chamber being held in a generally horizontal position. Vacuum is applied from line 15 through hose 21, chamber 25 and hose 19 to the milk withdrawing apparatus 13 to effect the withdrawal of milk from the animal and to cause the milk to flow through milk hose 19 into chamber 25. When the animal has been milked out, the weight of milk given may be noted from scale 33 (which may be preset to compensate for the weight of milk receiver 20 and bail 31) and recorded as desired. The operator, who will normally be standing generally opposite the milk withdrawing apparatus, may merely grasp handle 35 and pull it toward him rotating chamber 25 about its pivot to the position shown in Figure 3. A second stop member 37 engages the bail 31 limiting the movement of chamber 25 so that it remains in a generally vertical position. The arrangement is such that the center of gravity of the chamber, again either with or without milk therein, is to the left of pivot 32 as viewed in Figure 3, and the chamber in a state of stable equilibrium. Under the influence of the vacuum present in milk pipe line 15, milk is withdrawn from chamber 25 through hose 21 into the pipe line through which it may flow to an ultimate destination, as a holding tank (not shown). As the milk empties from chamber 25, a small amount of air may be introduced to the milk receiving apparatus 13, as by holding up a teat cup assembly 13a momentarily during its removal from the teat, or lifting it afterward, insuring that any milk in the receiving apparatus or milk hose 19 will flow into chamber 25. It should be noted that outlet nipple 30 is so placed on lid 28 that it is at the low point of chamber 25 when in the emptying position of Figure 3 so that all milk is drained from the chamber. After the chamber has emptied, it may be returned to the position shown in Figure 1 and the system is ready for milking the next animal.

Outlet nipple 30 preferably has a branch 30a to which a sample receptacle 38 may be connected so that samples of each animal's milk may be collected at periodic intervals, as once a month. A short length of rubber hose 39 is connected to nipple branch 30a and through a glass tube 40 and stopper 41 to the sample receptacle 38. A shutoff clamp 42 closes tube 39 except when a sample is being taken and receptacle 38 is generally connected to the tube only at the time the sample is actually drawn off.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In a milking system having means for withdrawing milk from an animal and an evacuated line, an intermediate milk receiver, comprising: means defining a chamber having an inlet and an outlet; means operably connecting said inlet directly to the milk withdrawing apparatus; means operably connecting said outlet to the carry-away milk line; pivotal mounting means supporting said chamber means for movement between a first position in which milk from said animal collects in the chamber and a second position in which the milk empties from the chamber through said outlet; and stop means operably associated with said chamber means and mounting means, said mounting means being between the center of gravity of the chamber means and the stop means in both of said positions so that the chamber means is in a condition of stable equilibrium in both of said positions.

2. In a milking system having means for withdrawing milk from an animal and an evacuated carry-away milk line, an intermediate milk receiver, comprising: means defining a chamber having an inlet and an outlet; means operably connecting said inlet to the milk withdrawing apparatus; means operably connecting said outlet to the carry-away milk line; and pivotal mounting means supporting said chamber means for rotational movement between a first position in which milk from said animal collects in the chamber and a second position in which milk empties from the chamber through said outlet, the outlet being above the normal level of milk in said chamber when the chamber is in said first position.

3. In a milking system having means for withdrawing milk from an animal and an evacuated carry-away milk line, an intermediate milk receiver, comprising: means defining a chamber having an inlet and an outlet; means operably connecting said inlet to the milk withdrawing apparatus; means operably connecting said outlet to the carry-away milk line; and means supporting said chamber means for movement between a first position in which milk from said animal collects in the chamber, both the inlet and the outlet being on the top thereof when in said first position, and a second position in which the milk empties from the chamber through said outlet, the outlet being substantially at the bottom thereof when in said second position.

4. In a milking system having means for withdrawing milk from an animal and an evacuated carry-away milk line, an intermediate milk receiver, comprising: means defining a generally round chamber having a top with an opening therein said opening being smaller than said top and being adjacent the periphery thereof; a removable lid for the opening in said chamber and having an inlet and an outlet; means operably connecting said inlet to the milk withdrawing apparatus; means operably connecting the outlet to said carry-away milk line; and pivotal means supporting said chamber means for manual movement between a first position in which said chamber is upright with the outlet above the normal level of milk therein and the milk from said animal collects therein, and a second position substantially 90° displaced from the first, in which the opening in the chamber means is at a low point and milk empties from the chamber through the outlet.

5. In a milking system having means for withdrawing milk from an animal and an evacuated carry-away milk line, an intermediate milk receiver, comprising: a generally round container defining chamber having a top surface with an opening therein smaller than said top surface and adjacent the periphery thereof; a removable lid for the opening in said chamber and having an inlet and an outlet therein; means operably connecting said inlet directly to the milk withdrawing apparatus; means operably connecting said outlet to the carry-away milk line; a handle secured to said container diametrically opposite said opening and projecting over the top of the container; and mounting means pivotally supporting said container about an axis transverse to the diameter of the container drawn between said handle and said opening, said container being manually movable between a first position in which the container is upright and the opening therein is on top, and the milk from said animal collects therein, and a second position substantially 90° displaced therefrom in which said outlet is at a low point and milk empties from the chamber through the outlet.

References Cited in the file of this patent

UNITED STATES PATENTS

| 1,534,939 | Fuge | Apr. 21, 1925 |
| 1,977,511 | Graves | Oct. 16, 1934 |

FOREIGN PATENTS

| 583,745 | Great Britain | Dec. 30, 1946 |

Disclaimer 2,793,612.—*Henry B. Babson*, Chicago, Ill. MILK RECEIVING APPARATUS. Patent dated May 28, 1957. Disclaimer filed Sept. 27, 1960, by the assignee, *Babson Bros. Co.*

Hereby enters this disclaimer to claims 2 and 3 of said patent.

[*Official Gazette November 1, 1960.*]